United States Patent
Bailey

(10) Patent No.: US 11,446,620 B2
(45) Date of Patent: Sep. 20, 2022

(54) FLASH CALCINED GYPSUM WALLBOARD

(71) Applicant: NATIONAL GYPSUM PROPERTIES, LLC, Charlotte, NC (US)

(72) Inventor: Joseph J. Bailey, Charlotte, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 936 days.

(21) Appl. No.: 15/612,713

(22) Filed: Jun. 2, 2017

(65) Prior Publication Data

US 2018/0346383 A1    Dec. 6, 2018

(51) Int. Cl.
| | |
|---|---|
| C04B 28/14 | (2006.01) |
| B01J 6/00 | (2006.01) |
| B32B 13/08 | (2006.01) |
| C04B 103/52 | (2006.01) |
| C04B 111/00 | (2006.01) |
| B28B 19/00 | (2006.01) |

(52) U.S. Cl.
CPC .............. *B01J 6/001* (2013.01); *B32B 13/08* (2013.01); *C04B 28/14* (2013.01); *B28B 19/0092* (2013.01); *C04B 2103/52* (2013.01); *C04B 2111/0062* (2013.01)

(58) Field of Classification Search
CPC .......... B32B 13/08; C04B 28/14; B01J 6/001
USPC ............................................ 156/39; 423/171
See application file for complete search history.

(56) References Cited

U.S. PATENT DOCUMENTS

| | | | |
|---|---|---|---|
| 3,782,986 A | 1/1974 | Vincent | |
| 3,835,219 A | 9/1974 | Jaunarajs et al. | |
| 3,977,890 A | 8/1976 | Jaunarajs et al. | |
| 6,083,465 A * | 7/2000 | Piasecki | C04B 11/028 106/772 |
| 6,815,049 B2 | 11/2004 | Veeramasuneni et al. | |
| 7,273,579 B2 | 9/2007 | Miller et al. | |
| 7,425,236 B2 | 9/2008 | Yu et al. | |
| 7,754,006 B2 | 7/2010 | Liu et al. | |
| 8,377,199 B2 | 2/2013 | Biguenet et al. | |
| 8,945,462 B2 * | 2/2015 | Taira | C04B 11/024 264/681 |
| 2001/0001218 A1 * | 5/2001 | Luongo | B28B 11/24 264/42 |
| 2010/0288415 A1 * | 11/2010 | Biguenet | C04B 28/147 156/39 |

\* cited by examiner

*Primary Examiner* — Jeffry H Aftergut
*Assistant Examiner* — Elizabeth Bradford
(74) *Attorney, Agent, or Firm* — Dority & Manning, P.A

(57) ABSTRACT

Processes are disclosed for producing gypsum-based products from a gypsum slurry. Additives or combinations of additives for improving compressive strength, fluidity and/or set time of the gypsum product are mixed in intimate contact with raw gypsum prior to or during grinding and/or flash calcination to form stucco. The stucco is used to prepare a gypsum slurry which is shaped and sets to form the gypsum product.

10 Claims, No Drawings

FLASH CALCINED GYPSUM WALLBOARD

BACKGROUND OF THE INVENTION

The present invention is directed to compositions and methods of making gypsum boards and, in particular, to the flash calcination of gypsum in the presence of additives for the manufacture of gypsum boards.

Gypsum products such as gypsum board (wallboard or drywall) are produced from stucco (calcium sulfate hemihydrate), which has the valuable property of being chemically reactive with water and will "set" quickly when the two are mixed together. Manufacturers mine and transport natural or synthetic raw gypsum to a mill, where it is dried, crushed/ground and calcined or heated to yield stucco. Various different types of mills can be used to dry and crush/grind the raw gypsum, such as a Raymond mill, an imp mill, and other mills known in the art. Calcination can be carried out using a variety of different types of calciners, such as rotary kilns, kettles and other calciners known in the art. Depending on the type of mill, the raw gypsum may be simultaneously crushed/ground and calcined to yield stucco. The calcination process is generally characterized by the following chemical reaction:

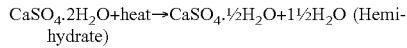
$$CaSO_4 \cdot 2H_2O + heat \rightarrow CaSO_4 \cdot \tfrac{1}{2}H_2O + 1\tfrac{1}{2}H_2O \text{ (Hemihydrate)}$$

This equation shows that calcium sulfate dihydrate plus heat yields calcium sulfate hemihydrate (stucco) plus water vapor.

The raw gypsum may also be calcined by flash calcination, where the raw gypsum is exposed to elevated temperatures for very short periods of time. The ground raw gypsum is placed in direct contact with a flow of high temperature gas, which rapidly calcines the raw gypsum to predominantly the calcium sulfate hemihydrate gypsum phase. Flash calcination may be carried out using a Calcidyne® process, impact (imp) mill (i.e. cage mills with energy added to accomplish flash drying/calcination), a Claudius Peters EM Mill, and other flash calcination systems known in the art. The temperatures employed in flash calcination generally range from about 350° C. to about 750° C., which is significantly higher than calcination systems such as kettle or rotary kiln calcination having temperatures ranging from about 120° C. to about 260° C. The raw gypsum is typically exposed to elevated temperature for only a few seconds, whereas calcination using a rotary kiln or kettle may occur over a period of minutes to hours. The stucco produced by flash calcination commonly comprises multiple gypsum phases, and is generally characterized by the following chemical reactions:

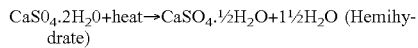
$$CaSO_4 \cdot 2H_2O + heat \rightarrow CaSO_4 \cdot \tfrac{1}{2}H_2O + 1\tfrac{1}{2}H_2O \text{ (Hemihydrate)}$$

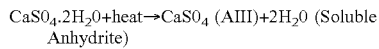
$$CaSO_4 \cdot 2H_2O + heat \rightarrow CaSO_4 \text{ (AIII)} + 2H_2O \text{ (Soluble Anhydrite)}$$

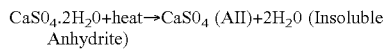
$$CaSO_4 \cdot 2H_2O + heat \rightarrow CaSO_4 \text{ (AII)} + 2H_2O \text{ (Insoluble Anhydrite)}$$

These equations show that flash calcination yields calcium sulfate hemihydrate (stucco), soluble anhydrite and insoluble anhydrite, in addition to residual uncalcined gypsum.

Calcination produces one of two forms of calcium sulfate hemihydrate: the α-hemihydrate form or the β-hemihydrate form. These two types of stucco are often produced by different means of calcination. While the β-hemihydrate form is normally used due to its lower cost, either type of calcium sulfate hemihydrate is suitable for use.

Gypsum board and other gypsum products are typically produced by mixing stucco with water to form an aqueous slurry that may be shaped as desired and allowed to set to form the gypsum product. The setting reaction reverses the chemical reaction that takes place in the calcination step, and proceeds according to the following equation:

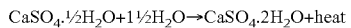
$$CaSO_4 \cdot \tfrac{1}{2}H_2O + 1\tfrac{1}{2}H_2O \rightarrow CaSO_4 \cdot 2H_2O + heat$$

In this reaction, the calcium sulfate hemihydrate (stucco) is rehydrated to form crystals of calcium sulfate dihydrate (gypsum) over a fairly short period of time. The actual time required for this setting reaction generally depends upon the type of calcination system employed, the properties of the resultant stucco such as particle size and gypsum phase, the type of raw gypsum that is used, and post-production treatment of the stucco such as cooling or conditioning. The reaction time can also be controlled to a certain extent by the use of additives such as accelerators and retarders.

Methods for the commercial manufacture of gypsum wallboard and other gypsum products are well known in the art, and typically involve a continuous, high-speed process. Wallboard has a gypsum core that is formed from a gypsum slurry comprising a mixture of dry and wet ingredients. The dry ingredients comprise calcium sulfate hemihydrate (stucco) and may include one or more known additives, such as fiberglass, accelerators, and in some cases natural polymers such as starch. The wet ingredients comprise water and may include one or more additional components, such as surfactants, dispersants, defoamers, retarders, rheology modifiers, paper pulp, and other additives, such as potash and natural polymers (often referred to as a "pulp solution"). Additional gauging water may be added to adjust the flowability of the gypsum slurry. The pulp solution and gauging water provide the significant portion of the water that forms the gypsum slurry. The dry ingredients, wet ingredients (pulp solution) and gauging water are combined in a mixing apparatus to form the gypsum slurry, such as a pin mixer or other suitable mixing apparatus.

The gypsum slurry is typically discharged from the mixer to a canister and is output through the mixer's outlet chute or "boot" which spreads the slurry onto a moving, continuous bottom sheet of facing material (bottom or back facer). A moving, continuous top sheet of facing material (top or front facer) is placed on the gypsum slurry, to sandwich the slurry between the top and bottom facers and form the wallboard. The facing material is commonly made of paper, but may be made of other suitable materials such as fiberglass mat. The board passes through a forming station which shapes the wallboard to the desired thickness and width. The wallboard then travels along a belt line for several minutes, during which time the rehydration reaction occurs and the board sets and stiffens. The wallboard is cut into a desired length and then fed into a large, continuous kiln for drying. During drying, the excess water (free water) is evaporated from the gypsum core while the chemically bound water is retained in the newly formed gypsum crystals.

Set gypsum is a brittle, crystalline material that has relatively low tensile, compression, and flexural strength as well as low nail and screw holding strength. Because of these characteristics, gypsum products, such as gypsum wallboard, are generally limited to non-structural, non-load bearing and non-impact absorbing applications, such as interior wall and ceiling applications. Accordingly, means to improve the tensile, flexural, compressive, nail and screw holding strength and impact resistance of gypsum products have long been and still are sought after in the industry. Also desired are means to reduce manufacture process costs through reduction in raw materials usage and energy demand, such as reducing the amount of water required for the gypsum slurry and the heat used to dry the wallboard in the kiln.

Numerous additives have been used to improve the physical properties of wallboard, and to facilitate the manufacturing process and reduce manufacturing costs. Such additives include accelerators, retarders, defoamers, dehydration inhibitors, binders, adhesives, dispersing aids, leveling or non-leveling agents, thickeners, bactericides, fungicides, pH adjusters, colorants, water repellants, fillers, aqueous foams, and mixtures thereof. Further examples of additives include: crystal modifiers, fibers, starch, secondary accelerators such as potash and aluminum sulfate, and phosphates or phosphate-containing components. Although the use of additives has proven beneficial, such additives also add to manufacturing costs. Thus, it would be desirable to improve the efficacy of additives, to reduce their usage and production costs.

SUMMARY OF THE INVENTION

A method of making a gypsum board is described, comprising the steps of combining raw gypsum, and an additive selected from the group consisting of: ammonium phosphate monobasic, ammonium phosphate dibasic, aluminum phosphate, sodium aluminum sulfate, calcium chloride, potassium chloride, sodium hydroxide, sodium bicarbonate, potassium carbonate, sodium carbonate, ferric chloride, ferric nitrate, aluminum nitrate, boric acid, ammonium sulfate, potassium sulfate, boric oxide, sodium trimetaphosphate, sodium phosphate tribasic dodecahydrate, citric acid, Borax, sodium tripolyphosphate, ammonium polyphosphate, sodium phosphate monobasic, trisodium phosphate, calcium phosphate monobasic, calcium phosphate tribasic, calcium carbonate, sodium phosphate tribasic dodecahydrate, calcium nitrate tetrahydrate, urea, talc, sodium acetate, aluminum sulfate, calcium phosphate dibasic, sodium metaborate, tartaric acid, trisodium phosphate, and potassium phosphate tribasic. The raw gypsum and additive are milled, and the milled raw gypsum and additive are flash calcined to produce stucco. The stucco is mixed with water to form a gypsum slurry, and the gypsum slurry is sandwiched between two sheets of facing material to form the gypsum board. In a further embodiment, the raw gypsum and additive are milled during flash calcination.

In another embodiment, a gypsum board is described that comprises a gypsum core sandwiched between two sheets of facing material. The gypsum core is formed from a gypsum slurry having a composition comprising a milled, flashed calcined mixture of raw gypsum and an additive selected from the group consisting of: ammonium phosphate monobasic, ammonium phosphate dibasic, aluminum phosphate, sodium aluminum sulfate, calcium chloride, potassium chloride, sodium hydroxide, sodium bicarbonate, potassium carbonate, sodium carbonate, ferric chloride, ferric nitrate, aluminum nitrate, boric acid, ammonium sulfate, potassium sulfate, boric oxide, sodium trimetaphosphate, sodium phosphate tribasic dodecahydrate, citric acid, Borax, sodium tripolyphosphate, ammonium polyphosphate, sodium phosphate monobasic, trisodium phosphate, calcium phosphate monobasic, calcium phosphate tribasic, calcium carbonate, sodium phosphate tribasic dodecahydrate, calcium nitrate tetrahydrate, urea, talc, sodium acetate, aluminum sulfate, calcium phosphate dibasic, sodium metaborate, tartaric acid, trisodium phosphate, and potassium phosphate tribasic. In a further embodiment, the raw gypsum and additive are milled during flash calcination.

DETAILED DESCRIPTION OF THE INVENTION

Compositions and methods are disclosed for the use of additives in the manufacture of gypsum board. Conventional methods of manufacturing wallboard commonly involve the addition of additives to the gypsum slurry at the pin mixer or boot. Applicants have unexpectedly found that the efficacy of the additives may be significantly improved by addition of the additives to the raw gypsum prior to or during calcination to produce stucco. The resulting mixture of additives and stucco is used as a component of the dry ingredients that are added to the gypsum slurry.

In one embodiment, one or more additives are added to the raw gypsum prior to the step of grinding or milling to produce stucco. The additives may be added to the raw gypsum as a dry powder, liquid solution or suspension and then ground or milled. In an alternative embodiment, the additives are added to the raw gypsum during grinding or milling. The combination of additives and raw gypsum are ground or milled using conventional methods and apparatus for the production of stucco, such as a Raymond mill. Without being limited by any particular theory, grinding or milling the additives with the raw gypsum prior to or during calcination produces intimate contact between the additives and the stucco. When incorporated into the gypsum slurry, the close proximity of the additives to the stucco (and to other additives in the composition) during the setting reaction is believed to facilitate and promote the effect of the additives on the newly formed gypsum crystals and the properties of the gypsum core.

The ground or milled mixture of additives and raw gypsum may be calcined using conventional methods and apparatus, such as a rotary kiln or kettle. In an alternative embodiment, the mixture of additives and raw gypsum may be simultaneously ground and calcined—i.e. milled during calcination, such as in an imp mill. In a preferred embodiment, the mixture of additives and raw gypsum is calcined by flash calcination, such as a Calcidyne® process, imp mill or Claudius Peters EM Mill. Flash calcination is a rapid, continuous process with limited dwell times and low pressures, which is believed to reduce the opportunity for degradation and loss of potency of the additives compared to conventional processes such as kettle or batch calcination that typically involve extended residence times under heat and pressure.

The introduction of additives to the gypsum slurry by addition to the raw gypsum prior to or during calcination (precalcination addition) unexpectedly results in significant improvement of the additives effects on the properties of the gypsum board and the manufacturing process, compared to conventional postcalcination addition of the additives to the gypsum slurry (e.g., at the pin mixer or boot). The advantages of precalcination addition include increasing compressive strength of the gypsum board, reducing water demand (increasing gypsum slurry fluidity), and accelerating the setting reaction. In addition, the precalcination addition of combinations of additives is unexpectedly found to have a synergistic effect on the improvement of compressive strength and other properties.

Precalcination addition has been found to supplement the effects of a wide range of additives. Additives that increase compressive strength and that are improved by precalcination addition, include: ammonium phosphate monobasic, ammonium phosphate dibasic, aluminum phosphate, sodium aluminum sulfate, calcium chloride, potassium chloride, sodium hydroxide, sodium bicarbonate, potassium carbonate, sodium carbonate, ferric chloride, iron (III) nitrate nonahydrate (ferric nitrate), aluminum nitrate, boric acid, ammonium sulfate, potassium sulfate, and boric oxide. Precalcination addition of these additives results in a significantly greater increase in the compressive strength of the gypsum matrix relative to the conventional postcalcination use of the same additives. Other additives that provide increased compressive strength and that benefit from precalcination addition, include: sodium trimetaphosphate (STMP), sodium phosphate tribasic dodecahydrate, citric acid, Borax, sodium tripolyphosphate (STPP), ammonium polyphosphate (APP), sodium phosphate monobasic, sodium phosphate tribasic (trisodium phosphate), calcium phosphate monobasic, calcium phosphate tribasic, calcium carbonate, sodium phosphate tribasic dodecahydrate, calcium nitrate tetrahydrate, urea, talc, sodium acetate. The improvement in compressive strength is observed at lower concentrations of additives—e.g., in amounts of about 0.1% or less and as low as about 0.01% by weight of raw gypsum (i.e. between about 0.01% to about 0.1%). Thus, precalcination addition may allow a reduction in materials usage and manufacturing costs without sacrificing the performance of the wallboard.

Some additives also show secondary benefits with precalcination addition which may further reduce manufacturing costs, such as reducing stucco water demand and increasing slurry fluidity, and accelerating the rate of gypsum set. Additives that exhibit reduced stucco water demand and that are improved by precalcination addition, include: STMP, STPP, APP, sodium phosphate monobasic, trisodium phosphate, sodium aluminum sulfate, ammonium phosphate monobasic, calcium carbonate, potassium carbonate, calcium chloride, potassium chloride, ferric chloride, aluminum sulfate, tartaric acid, citric acid, Borax, sodium phosphate tribasic dodecahydrate, calcium phosphate dibasic, calcium nitrate tetrahydrate, urea, talc, and sodium metaborate.

Additives that increase the rate of set and that are improved by precalcination addition, include: STMP, APP, sodium phosphate tribasic, sodium aluminum sulfate, ammonium phosphate monobasic, ammonium phosphate dibasic, calcium chloride, potassium chloride, sodium phosphate tribasic dodecahydrate, calcium phosphate dibasic, potassium carbonate, ferric nitrate, boric acid, ammonium sulfate, calcium carbonate, potassium sulfate, calcium phosphate monobasic, potassium phosphate tribasic, aluminum sulfate, tartaric acid, Borax, calcium nitrate tetrahydrate, urea, talc, sodium metaborate, and boric oxide. The improvements in water demand and/or rate of set are observed at concentrations of additives of about 1% or less, about 0.1%, and as low as about 0.01% by weight of raw gypsum (i.e. between about 0.01% to about 1%). Thus, precalcination addition may allow the reduction in the amount of water, which further reduces the energy demand, and may reduce the need for set accelerators, which further reduces manufacturing costs.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Example 1

The precalcination addition of additives was tested for its effects on gypsum board compressive strength. Various additives or combinations of additives were tested, as shown in Table I. Each of the additives was added to raw gypsum in amounts ranging from about 0.01% to about 2.5% by raw gypsum weight, although trends beyond these usage levels are anticipated. Stucco samples were prepared from each of the mixtures of additives and raw gypsum by calcination to roughly equivalent combined moisture levels. The stucco samples were used to prepare conventional gypsum slurry compositions in the laboratory, comprising 500 g of stucco and 425 g of water. For comparison, gypsum slurry compositions were also prepared by postcalcination addition of equivalent amounts of additives to the wet and/or dry ingredients of the gypsum slurry. Control gypsum slurry compositions were prepared without the additives.

The gypsum slurries were formed into 2 inch sample cubes and tested for compressive strength pursuant to the ASTM C472 standard. The testing was performed in multiple trials with separate controls prepared for each trial. Multiple sample cubes were tested for each additive, and the average dry weight (Dry Wt), average compressive strength (Compr Str), strength to weight ratio (Str/Wt), and change in compressive strength relative to the control were measured. The results of the compressive strength testing are shown in Table I.

TABLE I

Precalcination/Postcalcination Addition Of Additives-Effect On Compressive Strength

| | | | Average Cube Compressive Strength | | | |
| --- | --- | --- | --- | --- | --- | --- |
| Reagent | Reagent Usage | Pre/Post Calc'n | Dry Wt (g) | Compr Str (psi) | Str/Wt (psi/g) | Δ Str (%) |
| Control | 0 | N/A | 128.5 | 842.00 | 6.55 | — |
| Control | 0 | N/A | 135.1 | 903.74 | 6.69 | 7.33 |
| STMP | 0.01 | Pre | 130.8 | 1001.19 | 7.66 | 15.61 |
| | 0.1 | Pre | 129.6 | 889.65 | 6.86 | 3.63 |
| | 1 | Pre | 132.6 | 556.90 | 4.20 | −36.55 |
| | 2.5 | Pre | 136.3 | 411.40 | 3.02 | −54.41 |
| STP/STPP | 0.1 | Pre | 130.8 | 882.00 | 6.74 | 1.79 |
| APP | 0.01 | Pre | 130.8 | 909.91 | 6.96 | 5.04 |
| | 0.1 | Pre | 132.4 | 879.31 | 6.64 | 0.28 |

TABLE I-continued

Precalcination/Postcalcination Addition Of Additives-Effect On Compressive Strength

| Reagent | Reagent Usage | Pre/Post Calc'n | Average Cube Compressive Strength | | | |
|---|---|---|---|---|---|---|
| | | | Dry Wt (g) | Compr Str (psi) | Str/Wt (psi/g) | Δ Str (%) |
| | 1 | Pre | 134.1 | 797.03 | 5.94 | −10.23 |
| | 2.5 | Pre | 132.5 | 610.46 | 4.61 | −30.43 |
| Sodium phosphate monobasic | 0.1 | Pre | 130.4 | 887.63 | 6.81 | 2.78 |
| | 1 | Pre | 127.1 | 562.54 | 4.43 | −33.17 |
| | 2.5 | Pre | 111.8 | 405.90 | 3.63 | −45.15 |
| Trisodium phosphate | 0.01 | Pre | 127.5 | 833.67 | 6.54 | −1.23 |
| | 0.1 | Pre | 130.6 | 924.95 | 7.08 | 6.97 |
| | 1 | Pre | 130.0 | 966.96 | 7.44 | 12.34 |
| Sodium aluminum sulfate | 0.01 | Pre | 131.3 | 1217.69 | 9.27 | 40.00 |
| | 0.1 | Pre | 130.6 | 1198.36 | 9.18 | 38.57 |
| | 1 | Pre | 129.3 | 745.09 | 5.76 | −12.99 |
| Ammonium phosphate monobasic | 0.01 | Pre | 126.8 | 903.20 | 7.12 | 7.60 |
| | 0.1 | Pre | 132.1 | 1092.86 | 8.27 | 24.95 |
| | 1 | Pre | 112.5 | 350.46 | 3.11 | −52.97 |
| Ammonium phosphate dibasic | 0.01 | Pre | 130.1 | 1143.87 | 8.79 | 32.77 |
| | 0.1 | Pre | 130.2 | 1056.62 | 8.11 | 22.54 |
| | 1 | Pre | 127.9 | 913.00 | 7.14 | 7.82 |
| Calcium chloride | 0.01 | Pre | 129.5 | 859.04 | 6.63 | 0.17 |
| | 0.1 | Pre | 133.6 | 1362.79 | 10.20 | 54.07 |
| | 1 | Pre | 131.0 | 857.70 | 6.55 | −1.11 |
| Control | 0 | N/A | 127.3 | 639.45 | 5.02 | N/A |
| Aluminum phosphate | 0.01 | Pre | 130.6 | 899.31 | 6.89 | 37.13 |
| | 0.1 | Pre | 129.7 | 850.59 | 6.56 | 30.57 |
| | 1 | Pre | 128.2 | 1285.34 | 10.02 | 99.55 |
| Potassium chloride | 0.01 | Pre | 129.8 | 1205.48 | 9.28 | 84.84 |
| | 0.1 | Pre | 127.2 | 1074.21 | 8.45 | 68.18 |
| | 1 | Pre | 131.2 | 1279.30 | 9.75 | 94.16 |
| Sodium hydroxide | 0.01 | Pre | 128.6 | 1024.95 | 7.97 | 58.65 |
| | 0.1 | Pre | 129.3 | 1144.27 | 8.85 | 76.17 |
| | 1 | Pre | 130.0 | 1056.35 | 8.13 | 61.80 |
| Sodium bicarbonate | 0.01 | Pre | 129.8 | 984.01 | 7.58 | 50.97 |
| | 0.1 | Pre | 134.1 | 868.44 | 6.48 | 28.94 |
| | 1 | Pre | 130.0 | 974.21 | 7.49 | 49.21 |
| Potassium carbonate | 0.01 | Pre | 130.5 | 953.14 | 7.30 | 45.36 |
| | 0.1 | Pre | 131.4 | 1068.97 | 8.13 | 61.96 |
| | 1 | Pre | 128.7 | 1169.37 | 9.09 | 80.93 |
| Sodium carbonate | 0.01 | Pre | 130.5 | 1288.43 | 9.88 | 96.62 |
| | 0.1 | Pre | 128.2 | 1196.75 | 9.33 | 85.84 |
| | 1 | Pre | 131.6 | 881.19 | 6.70 | 33.32 |
| Ferric chloride | 0.01 | Pre | 132.6 | 1416.48 | 10.68 | 112.72 |
| | 0.1 | Pre | 127.8 | 1291.12 | 10.10 | 101.19 |
| | 1 | Pre | 134.4 | 1262.52 | 9.39 | 87.02 |
| Ferric nitrate | 0.01 | Pre | 130.5 | 1199.44 | 9.19 | 82.96 |
| | 0.1 | Pre | 130.1 | 1426.95 | 10.97 | 118.40 |
| | 1 | Pre | 132.5 | 1741.71 | 13.15 | 161.80 |
| Aluminum nitrate | 0.01 | Pre | 130.5 | 1324.13 | 10.15 | 102.06 |
| | 0.1 | Pre | 131.5 | 1915.13 | 14.57 | 190.06 |
| | 1 | Pre | 133.2 | 1565.74 | 11.75 | 134.01 |
| Boric acid | 0.01 | Pre | 131.2 | 1303.19 | 9.93 | 97.79 |
| | 0.1 | Pre | 128.9 | 1563.46 | 12.13 | 141.42 |
| | 1 | Pre | 131.6 | 1958.08 | 14.88 | 196.18 |
| Ammonium sulfate | 0.01 | Pre | 129.1 | 992.60 | 7.69 | 53.04 |
| | 0.1 | Pre | 128.9 | 1033.54 | 8.02 | 59.65 |
| | 1 | Pre | 128.3 | 1138.63 | 8.88 | 76.74 |
| Potassium sulfate | 0.01 | Pre | 131.2 | 921.06 | 7.02 | 39.77 |
| | 0.1 | Pre | 128.2 | 959.85 | 7.48 | 49.02 |
| | 1 | Pre | 130.7 | 1109.91 | 8.49 | 69.10 |
| Control | 0 | N/A | 130.6 | 1359.70 | 10.41 | N/A |
| Calcium carbonate | 0.01 | Pre | 130.0 | 1365.34 | 10.51 | 0.91 |
| | 0.1 | Pre | 131.3 | 1330.85 | 10.14 | −2.63 |
| | 1 | Pre | 129.1 | 1372.32 | 10.63 | 2.14 |
| Calcium phosphate monobasic | 0.01 | Pre | 130.8 | 1317.56 | 10.07 | −3.27 |
| | 0.1 | Pre | 129.5 | 1426.01 | 11.01 | 5.79 |
| | 1 | Pre | 128.3 | 1156.08 | 9.01 | −13.42 |
| Calcium phosphate tribasic | 0.01 | Pre | 129.2 | 1355.41 | 10.49 | 0.75 |
| | 0.1 | Pre | 133.1 | 1446.68 | 10.87 | 4.40 |
| | 1 | Pre | 128.9 | 1110.04 | 8.61 | −17.27 |
| Calcium carbonate | 0.01 | Post | 135.3 | 1207.76 | 8.92 | −14.29 |
| | 0.1 | Post | 131.5 | 1455.81 | 11.07 | 6.37 |
| | 1 | Post | 132.6 | 1492.59 | 11.25 | 8.09 |
| Calcium phosphate tribasic | 0.01 | Post | 131.6 | 1243.06 | 9.45 | −9.25 |
| | 0.1 | Post | 130.8 | 1092.19 | 8.35 | −19.77 |

TABLE I-continued

Precalcination/Postcalcination Addition Of Additives-Effect On Compressive Strength

| | | | | Average Cube Compressive Strength | | |
|---|---|---|---|---|---|---|
| Reagent | Reagent Usage | Pre/Post Calc'n | Dry Wt (g) | Compr Str (psi) | Str/Wt (psi/g) | Δ Str (%) |
| | 1 | Post | 130.1 | 1331.78 | 10.23 | −1.70 |
| Control | 0 | N/A | 133.2 | 1222.62 | 9.18 | N/A |
| Potassium phosphate monobasic | 0.01 | Pre | 130.2 | 1027.23 | 7.89 | −14.09 |
| | 0.1 | Pre | 129.7 | 1110.72 | 8.57 | −6.68 |
| | 1 | Pre | 126.1 | 237.45 | 1.88 | −79.49 |
| Potassium phosphate tribasic | 0.01 | Pre | 132.2 | 1026.42 | 7.76 | −15.42 |
| | 0.1 | Pre | 129.7 | 1063.07 | 8.20 | −10.70 |
| | 1 | Pre | 129.0 | 417.17 | 3.23 | −64.78 |
| Aluminum sulfate | 0.01 | Pre | 132.0 | 1093.53 | 8.28 | −9.79 |
| | 0.1 | Pre | 129.8 | 1108.57 | 8.54 | −6.99 |
| | 1 | Pre | 128.4 | 777.43 | 6.05 | −34.06 |
| STMP | 0.01 | Post | 131.3 | 967.09 | 7.36 | −19.79 |
| | 0.1 | Post | 128.9 | 1028.43 | 7.98 | −13.12 |
| | 1 | Post | 140.6 | 543.88 | 3.87 | −57.85 |
| APP | 0.01 | Post | 131.5 | 1073.80 | 8.17 | −11.05 |
| | 0.1 | Post | 130.1 | 1113.40 | 8.56 | −6.76 |
| | 1 | Post | 130.5 | 1074.34 | 8.23 | −10.35 |
| Aluminum phosphate | 0.01 | Post | 130.4 | 1118.50 | 8.58 | −6.59 |
| | 0.1 | Post | 129.1 | 1104.54 | 8.56 | −6.80 |
| | 1 | Post | 130.3 | 1203.60 | 9.23 | 0.59 |
| Ammonium phosphate monobasic | 0.01 | Post | 128.7 | 1259.57 | 9.78 | 6.58 |
| | 0.1 | Post | 129.2 | 973.67 | 7.53 | −17.93 |
| | 1 | Post | 87.1 | 193.42 | 2.22 | −75.80 |
| Sodium aluminum sulfate | 0.01 | Post | 130.8 | 1243.20 | 9.50 | 3.53 |
| | 0.1 | Post | 131.2 | 1086.96 | 8.28 | −9.78 |
| | 1 | Post | 127.6 | 621.60 | 4.87 | −46.93 |
| Sodium carbonate | 0.01 | Post | 131.1 | 1266.55 | 9.66 | 5.21 |
| | 0.1 | Post | 131.7 | 1038.77 | 7.89 | −14.08 |
| | 1 | Post | 133.4 | 803.54 | 6.02 | −34.40 |
| Ferric nitrate | 0.01 | Post | 129.6 | 981.99 | 7.57 | −17.49 |
| | 0.1 | Post | 130.9 | 921.19 | 7.04 | −23.32 |
| | 1 | Post | 119.5 | 717.17 | 6.00 | −34.61 |
| Aluminum nitrate | 0.01 | Post | 134.1 | 1263.60 | 9.42 | 2.67 |
| | 0.1 | Post | 131.9 | 1271.52 | 9.64 | 4.98 |
| | 1 | Post | 127.1 | 872.60 | 6.87 | −25.19 |
| Boric acid | 0.01 | Post | 131.2 | 1255.68 | 9.57 | 4.28 |
| | 0.1 | Post | 131.6 | 1183.20 | 8.99 | −2.07 |
| | 1 | Post | 129.7 | 1151.65 | 8.88 | −3.25 |
| Ammonium sulfate | 0.01 | Post | 131.5 | 1279.30 | 9.73 | 6.01 |
| | 0.1 | Post | 130.2 | 1069.91 | 8.22 | −10.49 |
| | 1 | Post | 127.1 | 1053.27 | 8.29 | −9.70 |
| Potassium sulfate | 0.01 | Post | 130.8 | 1197.56 | 9.15 | −0.28 |
| | 0.1 | Post | 128.0 | 1044.81 | 8.17 | −11.05 |
| | 1 | Post | 127.6 | 1044.41 | 8.19 | −10.83 |
| Aluminum sulfate | 0.01 | Post | 129.9 | 1311.11 | 10.10 | 9.98 |
| | 0.1 | Post | 129.2 | 1156.08 | 8.95 | −2.55 |
| | 1 | Post | 124.6 | 542.54 | 4.35 | −52.57 |
| Control | 0 | N/A | 132.4 | 1005.75 | 7.59 | N/A |
| Tartaric acid | 0.01 | Pre | 132.3 | 988.84 | 7.47 | −1.60 |
| | 0.1 | Pre | 132.5 | 1157.96 | 8.74 | 15.06 |
| | 1 | Pre | 85.0 | 125.37 | 1.47 | −80.58 |
| Citric acid | 0.01 | Pre | 131.7 | 1128.43 | 8.57 | 12.84 |
| | 0.1 | Pre | 130.2 | 633.14 | 4.86 | −35.99 |
| | 1 | Pre | 119.6 | 475.29 | 3.97 | −47.69 |
| Tartaric acid | 0.01 | Post | 131.2 | 1059.44 | 8.07 | 6.30 |
| | 0.1 | Post | 128.8 | 923.61 | 7.17 | −5.61 |
| | 1 | Post | 25.8 | 24.16 | 0.94 | −87.67 |
| Citric acid | 0.01 | Post | 132.3 | 929.11 | 7.03 | −7.50 |
| | 0.1 | Post | 129.6 | 271.27 | 2.09 | −72.44 |
| | 1 | Post | 68.8 | 169.13 | 2.46 | −67.61 |
| Control | 0 | N/A | 144.9 | 1081.05 | 7.46 | N/A |
| Borax | 0.1 | Pre | 132.0 | 755.77 | 5.72 | −23.27 |
| | 1 | Pre | 140.8 | 1644.26 | 11.68 | 56.53 |
| Trimagnesium Phosphate | 0.1 | Pre | 142.4 | 1148.84 | 8.07 | 8.14 |
| | 1 | Pre | 135.0 | 692.34 | 5.13 | −31.26 |
| Sodium phosphate tribasic dodecahydrate | 0.1 | Pre | 134.1 | 1086.96 | 8.10 | 8.63 |
| | 1 | Pre | 135.3 | 1268.83 | 9.38 | 25.74 |
| Borax | 0.1 | Post | 139.5 | 1427.35 | 10.23 | 37.13 |
| | 1 | Post | 136.7 | 950.85 | 6.95 | −6.79 |
| Trimagnesium phosphate | 0.1 | Post | 139.6 | 1595.13 | 11.43 | 53.19 |
| | 1 | Post | 140.4 | 853.67 | 6.08 | −18.48 |
| Sodium phosphate tribasic | 0.1 | Post | 138.9 | 1508.43 | 10.86 | 45.56 |

TABLE I-continued

Precalcination/Postcalcination Addition Of Additives-Effect On Compressive Strength

| Reagent | Reagent Usage | Pre/Post Calc'n | Dry Wt (g) | Compr Str (psi) | Str/Wt (psi/g) | Δ Str (%) |
|---|---|---|---|---|---|---|
| dodecahydrate | 1 | Post | 134.5 | 1031.39 | 7.67 | 2.78 |
| Control | 0 | N/A | 134.0 | 1088.70 | 8.12 | N/A |
| Calcium phosphate dibasic | 0.01 | Pre | 130.9 | 901.46 | 6.89 | −15.22 |
|  | 0.1 | Pre | 130.5 | 1147.76 | 8.79 | 8.27 |
|  | 1 | Pre | 130.0 | 1119.04 | 8.61 | 5.94 |
| Calcium nitrate tetrahydrate | 0.005 | Pre | 134.2 | 1265.88 | 9.44 | 16.17 |
|  | 0.05 | Pre | 132.9 | 1288.97 | 9.70 | 19.44 |
|  | 0.5 | Pre | 132.1 | 956.22 | 7.24 | −10.89 |
|  | 2.5 | Pre | 134.8 | 829.11 | 6.15 | −24.28 |
| Urea | 0.01 | Pre | 129.3 | 1124.94 | 8.70 | 7.11 |
|  | 0.1 | Pre | 129.6 | 1121.72 | 8.65 | 6.55 |
|  | 1 | Pre | 131.4 | 1080.38 | 8.22 | 1.25 |
| Talc | 0.01 | Pre | 136.1 | 988.17 | 7.26 | −10.62 |
|  | 0.1 | Pre | 133.7 | 1112.73 | 8.32 | 2.44 |
|  | 1 | Pre | 138.2 | 1444.67 | 10.45 | 28.69 |
| Calcium phosphate dibasic | 0.01 | Post | 137.3 | 1133.13 | 8.25 | 1.60 |
|  | 0.1 | Post | 128.8 | 1106.29 | 8.59 | 5.70 |
|  | 1 | Post | 131.5 | 1122.66 | 8.53 | 5.06 |
| Control | 0 | N/A | 131.1 | 1077.43 | 8.22 | N/A |
| Sodium acetate | 0.01 | Pre | 137.2 | 1254.47 | 9.14 | 11.23 |
|  | 0.1 | Pre | 135.0 | 1279.44 | 9.48 | 15.30 |
|  | 1 | Pre | 134.6 | 682.40 | 5.07 | −38.30 |
| Control | 0 | N/A | 128.5 | 907.63 | 7.06 | N/A |
| Sodium metaborate | 1 | Pre | 128.0 | 882.67 | 6.89 | −2.4 |
| Boric oxide | 1 | Pre | 127.7 | 1371.78 | 10.74 | 52.1 |
| Sodium metaborate | 1 | Post | 128.8 | 1126.29 | 8.74 | 23.8 |
| Boric oxide | 1 | Post | 130.1 | 871.79 | 6.70 | −5.1 |
| Control | 0 | N/A | 125.6 | 1495.14 | 11.90 | −79.60 |
| Aluminum dihydrogen phosphate | 0.01 | Pre | 129.8 | 1448.96 | 11.16 | −6.22 |
|  | 0.1 | Pre | 122.6 | 1461.11 | 11.92 | 0.10 |
|  | 1 | Pre | 128.0 | 409.52 | 3.20 | −73.13 |

Example 2

The precalcination addition of additives was tested for its effect on the fluidity (water demand) and set time of the gypsum slurry. Various additives or combinations of additives were tested, as shown in Table II. Precalcination, postcalcination and control gypsum slurry compositions comprising 500 g of stucco and 425 g of water were prepared as described in Example 1. The water demand was determined using a slump test in which a varying amount of water was added to 100 g of stucco, as is known in the art. Water demand was measured as the amount (grams) of water required to achieve a patty having a 3 inch target diameter. The set rate of the gypsum slurry was measured as the time of setting in minutes, determined using the Gilmore method with a ¼-pound initial needle and a 1-pound final needle, as is known in the art. Testing was performed in multiple trials with separate controls prepared for each trial. The results of the testing are shown in Table II.

TABLE II

Precalcination/Postcalcination Addition Of Additives-Effect On Water Demand And Rate Of Set

| Reagent | Reagent Usage | Pre/Post Calc'n | Water (g) | Patty Dia (in) | ¼# Set (min) | 1# Set (min) |
|---|---|---|---|---|---|---|
| Control | 0 | N/A | 76 | 3 | 27.5 | 40 |
| Control | 0 | N/A | 72 | 3.03 | 17.5 | 30.7 |
| STMP | 0.01 | Pre | 73.5 | 3.06 | 13 | 22.75 |
|  | 0.1 | Pre | 73.5 | 2.98 | 17.5 | 27 |
|  | 1 | Pre | 72 | 2.94 | 12 | 19.5 |
|  | 2.5 | Pre | 70 | 3.06 | 11 | 17.5 |
| STP/STPP | 0.1 | Pre | 70 | 2.94 | 20 | 36.5 |
| APP | 0.01 | Pre | 72 | 2.88 | 19.3 | 32.3 |
|  | 0.1 | Pre | 72 | 3 | 14.8 | 26.5 |
|  | 1 | Pre | 77 | 3 | 16 | 27.3 |
|  | 2.5 | Pre | 88 | 3 | 30 | 34.6 |
| Sodium phosphate monobasic | 0.1 | Pre | 71 | 3 | 22.5 | 37 |
|  | 1 | Pre | 69 | 3 | 34 | 49.75 |
|  | 2.5 | Pre | 62.5 | 3 | >60 | >60 |
| Trisodium phosphate | 0.01 | Pre | 71.5 | 3 | 22 | 36 |

TABLE II-continued

Precalcination/Postcalcination Addition Of Additives-Effect On Water Demand And Rate Of Set

| Reagent | Reagent Usage | Pre/Post Calc'n | Water (g) | Patty Dia (in) | ¼# Set (min) | 1# Set (min) |
|---|---|---|---|---|---|---|
| | 0.1 | Pre | 70 | 2.94 | 18 | 30.5 |
| | 1 | Pre | 69 | 2.78 | 8.25 | 18.75 |
| Sodium aluminum sulfate | 0.01 | Pre | 72 | 2.94 | 15.3 | 26.25 |
| | 0.1 | Pre | 70.5 | 3 | 20.5 | 34.25 |
| | 1 | Pre | 68 | 2.88 | 12.5 | 25 |
| Ammonium phosphate monobasic | 0.01 | Pre | 68 | 2.94 | 14.75 | 27.42 |
| | 0.1 | Pre | 70 | 2.88 | 21.25 | 35.25 |
| | 1 | Pre | 71 | 2.91 | 27.5 | <40 |
| Ammonium phosphate dibasic | 0.01 | Pre | 72 | 2.97 | 17.17 | 29.17 |
| | 0.1 | Pre | 72.5 | 3.06 | 15.25 | 25.75 |
| | 1 | Pre | 73 | 3.10 | 14 | <22 |
| Calcium chloride | 0.01 | Pre | 70 | 3 | 16.33 | 28 |
| | 0.1 | Pre | 66 | 2.97 | 14.17 | 29.6 |
| | 1 | Pre | 70.5 | 3 | 8.75 | 17.5 |
| Control | 0 | N/A | 72 | 2.91 | 9.75 | 16.5 |
| Aluminum phosphate | 0.01 | Pre | 72 | 2.91 | 12.75 | 22.67 |
| | 0.1 | Pre | 72 | 2.91 | 24 | 38.83 |
| | 1 | Pre | 72 | 2.88 | 14.5 | 24.25 |
| Potassium chloride | 0.01 | Pre | 73 | 2.84 | 24 | 35.5 |
| | 0.1 | Pre | 75 | 2.91 | 19.25 | 29.25 |
| | 1 | Pre | 69.5 | 2.91 | 4.25 | 6.33 |
| Sodium hydroxide | 0.01 | Pre | 75 | 2.91 | 23.75 | 35.5 |
| | 0.1 | Pre | 76 | 2.94 | 16.25 | 27 |
| | 1 | Pre | 76 | 3.03 | 9.25 | 14 |
| Sodium bicarbonate | 0.01 | Pre | 72 | 2.88 | 26.67 | 42.5 |
| | 0.1 | Pre | 75 | 2.91 | 19.5 | 32.5 |
| | 1 | Pre | 72 | 3 | 14.08 | 19.5 |
| Potassium carbonate | 0.01 | Pre | 72 | 2.97 | ~28 | 42 |
| | 0.1 | Pre | 74 | 2.91 | 17.83 | 27.42 |
| | 1 | Pre | 74 | 3 | 5.25 | <9 |
| Sodium carbonate | 0.01 | Pre | 72 | 2.75 | 15.67 | 27.3 |
| | 0.1 | Pre | 74 | 2.94 | 18.75 | 29.75 |
| | 1 | Pre | 74 | 3 | 13.17 | 16.72 |
| Ferric chloride | 0.01 | Pre | 76 | 2.72 | 14.75 | 26.25 |
| | 0.1 | Pre | 76 | 2.81 | 22 | 35.5 |
| | 1 | Pre | 64 | 2.97 | 9.25 | 18.75 |
| Ferric nitrate | 0.01 | Pre | 74 | 2.75 | 17.5 | 29.5 |
| | 0.1 | Pre | 74 | 2.97 | 15.5 | 27 |
| | 1 | Pre | 67 | 3.06 | 11.33 | 22 |
| Aluminum nitrate | 0.01 | Pre | 76 | 3.16 | 19 | 30 |
| | 0.1 | Pre | 76 | 2.91 | 15.42 | 27.65 |
| | 1 | Pre | 66 | 2.94 | 13.33 | 27.25 |
| Boric acid | 0.01 | Pre | 76 | 2.88 | 20.83 | 33.75 |
| | 0.1 | Pre | 76 | 2.81 | 13.83 | 23 |
| | 1 | Pre | 76 | 3 | 3.75 | 7 |
| Ammonium sulfate | 0.01 | Pre | 72 | 3.06 | 11.75 | 22.5 |
| | 0.1 | Pre | 72 | 2.94 | 15.08 | 26.58 |
| | 1 | Pre | 74 | 3.03 | 4 | 6.5 |
| Potassium sulfate | 0.01 | Pre | 71 | 3 | 25.5 | 41.67 |
| | 0.1 | Pre | 74 | 2.88 | 17.25 | 27.92 |
| | 1 | Pre | 76 | 2.97 | 5.92 | 8.67 |
| Control | 0 | N/A | 72 | 2.94 | 9 | 18.1 |
| Calcium carbonate | 0.01 | Pre | 72 | 3 | 14.83 | 26 |
| | 0.1 | Pre | 72 | 3 | 8.75 | 17.17 |
| | 1 | Pre | 72 | 3 | 10.75 | 21.17 |
| Calcium phosphate monobasic | 0.01 | Pre | 72 | 3 | 9 | 17.50 |
| | 0.1 | Pre | 72 | 3.00 | 11.75 | 22.00 |
| | 1 | Pre | 72 | 3.16 | 28.75 | 47.67 |
| Calcium phosphate tribasic | 0.01 | Pre | 72 | 3.09 | 13.25 | 25.25 |
| | 0.1 | Pre | 72 | 2.88 | 24.5 | 40.58 |
| | 1 | Pre | 73 | 3.00 | 26.00 | 42.00 |
| Calcium carbonate | 0.01 | Post | 74 | 2.78 | 19 | 35 |
| | 0.1 | Post | 72 | 2.97 | 16 | 29 |
| | 1 | Post | 75 | 2.81 | 16.5 | 31.25 |
| Calcium phosphate tribasic | 0.01 | Post | 72 | 2.69 | 14.25 | 23.83 |
| | 0.1 | Post | 72 | 2.72 | 19.67 | 35.25 |
| | 1 | Post | 73 | 2.75 | 20.50 | 33.75 |
| Control | 0 | N/A | 74 | 2.84 | 19.33 | 32.0 |
| Potassium phosphate monobasic | 0.01 | Pre | 74 | 2.88 | 19.25 | 34.75 |
| | 0.1 | Pre | 74 | 2.75 | 22.5 | 39.00 |
| | 1 | Pre | 74 | 2.75 | 45.00 | over 60 |
| Potassium phosphate | 0.01 | Pre | 74 | 3.00 | 24 | 39.50 |

TABLE II-continued

Precalcination/Postcalcination Addition Of Additives-Effect On Water Demand And Rate Of Set

| Reagent | Reagent Usage | Pre/Post Calc'n | Water Demand, Rate Of Set | | | |
|---|---|---|---|---|---|---|
| | | | Water (g) | Patty Dia (in) | ¼# Set (min) | 1# Set (min) |
| tribasic | 0.1 | Pre | 74 | 2.94 | 16.5 | 29.50 |
| | 1 | Pre | 74 | 2.75 | 23.00 | 80.00 |
| Aluminum sulfate | 0.01 | Pre | 73.5 | 3.00 | 13.5 | 25.50 |
| | 0.1 | Pre | 73.5 | 2.75 | 19 | 32.00 |
| | 1 | Pre | 72.5 | 3.09 | 8.25 | 17.17 |
| STMP | 0.01 | Post | 73.5 | 3 | 18.75 | 34.67 |
| | 0.1 | Post | 72.5 | 2.81 | 18 | 30.33 |
| | 1 | Post | 72.75 | 2.78 | 13.25 | 21 |
| APP | 0.01 | Post | 73 | 2.88 | 24 | 39.5 |
| | 0.1 | Post | 74 | 2.63 | 19.5 | 34.5 |
| | 1 | Post | 88 | 2.75 | 12.58 | 18.5 |
| Aluminum phosphate | 0.01 | Post | 73 | 2.84 | 18.75 | 33 |
| | 0.1 | Post | 74 | 3.16 | 18.5 | 32.75 |
| | 1 | Post | 73.5 | 3 | 21 | 34.92 |
| Ammonium phosphate monobasic | 0.01 | Post | 73 | 2.84 | 19 | 31.67 |
| | 0.1 | Post | 75 | 2.97 | 45 | 65 |
| | 1 | Post | 76 | 3.06 | 45* | 50 |
| Sodium aluminum sulfate | 0.01 | Post | 73 | 2.75 | 18.25 | 31.33 |
| | 0.1 | Post | 72 | 2.75 | 16.75 | 31 |
| | 1 | Post | 69.5 | 2.81 | 13.83 | 26.5 |
| Sodium carbonate | 0.01 | Post | 73.5 | 2.94 | 20 | 35 |
| | 0.1 | Post | 75.5 | 3 | 29 | 45 |
| | 1 | Post | 75.5 | 2.63 | 11.25 | 20 |
| Ferric nitrate | 0.01 | Post | 74 | 2.81 | 16.5 | 29.65 |
| | 0.1 | Post | 75 | 3.09 | 16.5 | 29.62 |
| | 1 | Post | 68 | 2.88 | 14.5 | 28.5 |
| Aluminum nitrate | 0.01 | Post | 74 | 2.75 | 18.5 | 33.12 |
| | 0.1 | Post | 75 | 3 | 24 | 41 |
| | 1 | Post | 70 | 2.88 | 19.17 | 35 |
| Boric acid | 0.01 | Post | 73 | 2.75 | 19.77 | 34.83 |
| | 0.1 | Post | 74 | 3 | 19 | 34.83 |
| | 1 | Post | 74 | 3.16 | 24.5 | 42.5 |
| Ammonium Sulfate | 0.01 | Post | 74 | 2.91 | 23.50 | 40.75 |
| | 0.1 | Post | 74 | 2.94 | 15.58 | 26.83 |
| | 1 | Post | 75 | 2.84 | 4.5 | 6.83 |
| Potassium sulfate | 0.01 | Post | 73.5 | 2.91 | 17.83 | 33.00 |
| | 0.1 | Post | 76.5 | 3.09 | 13.25 | 24.75 |
| | 1 | Post | 77 | 3.13 | 5.25 | 7.00 |
| Aluminum Sulfate | 0.01 | Post | 73.5 | 2.94 | 17.83 | 32.00 |
| | 0.1 | Post | 73.5 | 2.94 | 17.17 | 32.00 |
| | 1 | Post | 72.5 | 3.13 | 13.50 | 26.75 |
| Control | 0 | N/A | 73 | 2.75 | 15.75 | 26.5 |
| Tartaric acid | 0.01 | Pre | 74 | 2.94 | 15 | 27.75 |
| | 0.1 | Pre | 70 | 3.25 | 14.5 | 26.50 |
| | 1 | Pre | 64 | 3.38 | 30.67 | 110.00 |
| Citric acid | 0.01 | Pre | 74 | 2.94 | 26 | 42.00 |
| | 0.1 | Pre | 74 | 2.88 | 90 | 105.00 |
| | 1 | Pre | 64.5 | 3.13 | 120+ | 120+ |
| Tartaric acid | 0.01 | Post | 74 | 2.88 | 19.25 | 35.83 |
| | 0.1 | Post | 72 | 2.88 | 33 | 58.75 |
| | 1 | Post | 71 | 2.88 | 45-100 | 45-100 |
| Citric acid | 0.01 | Post | 74 | 3.13 | 26.25 | 41.00 |
| | 0.1 | Post | 73 | 3.31 | 115 | 125.00 |
| | 1 | Post | 67 | 3.03 | 120+ | 20+ hrs |
| Control | 0 | N/A | 75 | 2.94 | 13.00 | 25.5 |
| Borax | 0.1 | Pre | 74 | 3.06 | 23.17 | 40.00 |
| | 1 | Pre | 75 | 2.63 | 7.83 | 17.00 |
| Trimagnesium phosphate | 0.1 | Pre | 75 | 2.78 | 26.00 | 49.00 |
| | 1 | Pre | 76 | 3.25 | 30.17 | 95.00 |
| Sodium phosphate tribasic dodecahydrate | 0.1 | Pre | 75 | 3.25 | 13.00 | 19.00 |
| | 1 | Pre | 74 | 3.00 | 8.25 | 17.00 |
| Borax | 0.1 | Post | 75 | 2.69 | 14 | 27.50 |
| | 1 | Post | 76 | 2.91 | 38 | 75.00 |
| Trimagnesium phosphate | 0.1 | Post | 76 | 3.13 | 11.83 | 24.50 |
| | 1 | Post | 76 | 2.88 | 19.5 | 60+ |
| Sodium phosphate tribasic dodecahydrate | 0.1 | Post | 76 | 3.25 | 17 | 33.00 |
| | 1 | Post | 75 | 2.91 | 18.42 | 70+ |
| Control | 0 | N/A | 74 | 3.13 | 13.75 | 25.0 |
| Calcium phosphate dibasic | 0.01 | Pre | 72 | 3.06 | 18.75 | 32.50 |
| | 0.1 | Pre | 72 | 3.06 | 17.5 | 30.50 |
| | 1 | Pre | 71 | 3.03 | 22.00 | 38.75 |
| Calcium nitrate | 0.005 | Pre | 74 | 3.06 | 15.5 | 30 |

TABLE II-continued

Precalcination/Postcalcination Addition Of Additives-Effect
On Water Demand And Rate Of Set

| Reagent | Reagent Usage | Pre/Post Calc'n | Water (g) | Patty Dia (in) | ¼# Set (min) | 1# Set (min) |
|---|---|---|---|---|---|---|
| tetrahydrate | 0.05 | Pre | 74 | 3.03 | 10.5 | 21.0 |
|  | 0.5 | Pre | 72 | 3.00 | 20 | 34.2 |
|  | 2.5 | Pre | 68 | 3.16 | 12.5 | 24.3 |
| Urea | 0.01 | Pre | 68 | 2.94 | 11.5 | 21.75 |
|  | 0.1 | Pre | 72 | 3.06 | 8.5 | 17.0 |
|  | 1 | Pre | 68 | 2.81 | 4.17 | 10.0 |
| Talc | 0.01 | Pre | 74 | 3.38 | 9.75 | 20.75 |
|  | 0.1 | Pre | 71 | 3.00 | 11.5 | 22.5 |
|  | 1 | Pre | 72 | 3.00 | 9.50 | 21.0 |
| Calcium phosphate dibasic | 0.01 | Post | 74 | 3.00 | 20 | 40.00 |
|  | 0.1 | Post | 72 | 3.13 | 10.00 | 19.00 |
|  | 1 | Post | 72 | 3.00 | 22.50 | 41.00 |
| Control | 0 | N/A | 72 | 3.06 | 13.50 | 30.8 |
| Sodium acetate | 0.01 | Pre | 73 | 3.13 | 23.50 | 44 |
|  | 0.1 | Pre | 75 | 2.88 | 24.5 | 43.8 |
|  | 1 | Pre | 75 | 3.09 | 34.25 | 56.0 |
| Control | 0 | N/A | 69 | 3.13 | 13 | 25 |
| Sodium metaborate | 1 | Pre | 66 | 3.06 | 9 | 15.0 |
| Boric oxide | 1 | Pre | 69 | 2.94 | 3 | 9.0 |
| Sodium metaborate | 1 | Post | 65 | 2.94 | 44 | 80 |
| Boric oxide | 1 | Post | 65 | 3.00 |  |  |
| Control | 0 | N/A | 68 | 3.00 | 17.85 | 33.65 |
| Aluminum dihydrogen phosphate | 0.01 | Pre | 68 | 3.00 | 16.5 | 32.6 |
|  | 0.1 | Pre | 68 | 3.00 | 22.5 | 39.7 |
|  | 1 | Pre | 67 | 3.00 | 44.3 | 61.4 |

As shown in Tables I and II, the precalcination addition of additives increased the compressive strength of gypsum cubes by up to 200%, while also reducing water demand and increasing the rate of set. Of the additives tested, almost all showed an improvement in compressive strength when added prior to calcination. Thus, the precalcination addition of additives increases their general effectiveness, often in unexpected ways. The increase in effectiveness allows for a reduction in usage levels of the additives, or the substitution of one additive for another.

The increase in effectiveness due to precalcination addition does not appear to negatively affect the fluidity of the stucco slurry. For example, lab boards made using 1% boric acid added prior to calcination maintained equivalent fluidity and rate of set as a 1:1 water to stucco control at a 0.82 water to stucco level while using only 1.2 grams of BMA (gypsum based ball mill accelerator) as opposed to the 12 grams of BMA that was used in the control. The controls had to use 2.4 grams of Gypflo TF dispersant and 8 grams of BMA per 870 grams of stucco to maintain equivalent fluidity and set at the 0.82 water to stucco level as the aridized boric acid stucco.

Example 3

Precalcination addition was found to be particularly effective using boric acid, in view of the results in Tables I and II. Additional testing was performed to further evaluate the effects of adding boric acid prior to calcination on the properties of stucco. Precalcination and control gypsum slurry compositions were prepared comprising 100 g of stucco and varying amounts of water. Boric acid or boric oxide were added (precalcination) in an amount of 1% by weight of raw gypsum. A modified quick mix consistency and set test (water demand and rate of hydration) was performed using a five second stucco pour and a five second stucco mix in the consistency cup prior to pouring through a funnel to measure slurry spread, was performed using varying amounts of boric acid added prior to calcination. This modified test more accurately reflects process fluidity characteristics of the stucco. Water demand was measured using a 3 inch patty target diameter, and rate of set was measured using the Gilmore method as described in Example 2. The results of the testing are shown in Table III.

TABLE III

Precalcination Addition Of Boric Acid/Boric Oxide-Effect
On Consistency And Set

| Additive | Borate (%) | Stucco (g) | Water (g) | Patty Dia (in) | ¼# Set (min) | 1# Set (min) |
|---|---|---|---|---|---|---|
| Control 1 | 0 | 100 | 73 | 3.0 | 13.8 | 24.3 |
| Pre: Boric Acid | 1 | 100 | 67 | 3.0 | 3.4 | 8.0 |
| Control 2 | 0 | 100 | 65 | 3.3 | 25 | ~40 |
| Pre: Boric Oxide | 1 | 100 | 60 | 3.1 | 3.0 | 9.0 |

The results in Table III clearly show that the precalcination addition of boric acid and boric oxide reduce the amount of water needed to produce a stucco slurry having an acceptable consistency and level of fluidity at an accelerated rate of set. This is particularly true for higher usage levels of boric acid and boric oxide.

Example 4

The precalcination addition of certain combinations of additives, such as two or more of boric acid, potash, ammonium sulfate, and sodium trimetaphosphate, was surprisingly found to have synergistic effects on the properties of the resulting gypsum product in comparison to conventional postcalcination addition. The precalcination addition of multiple additives was tested for their effects on gypsum board compressive strength. Although other combinations are possible, combinations of boric acid, potash, ammonium sulfate (Am. Sulfate) and/or sodium trimetaphosphate (STMP) were evaluated for relative compressive strength when added prior to calcination against both a neat control and a control with equivalent combinations of additives added after calcination. Gypsum slurry compositions were prepared are described in Example 1, comprising 500 g of stucco and 425 g of water, with a water to stucco ratio of 0.85. Additives were used in the following amounts: boric acid 5 g (1% by weight raw gypsum), potash 0.50 g, ammonium sulfate 0.50 g, and STMP 0.05 g. Multiple sample cubes were tested for each additive combination, and the average dry weight (Dry Wt), average compressive strength (Compr Str), strength to weight ratio (Str/Wt), and change in compressive strength relative to the control (vs ctrl) and precalcination versus postclacination (pre vs post) were measured. The results of the compressive strength testing are shown in Table IV.

TABLE IV

Precalcination/Postcalcination Addition Of Multiple Additives - Synergistic Effect On Compressive Strength

| | Additive | Dry Wt (g) | Compr Str (psi) | Str/Wt (psi/g) | Δ Str (%) (vs Ctrl) | Δ Str (%) (pre vs post) |
|---|---|---|---|---|---|---|
| | Control | 134.3 | 1113.80 | 8.29 | 0 | 0 |
| Post: | Boric Acid | 132.5 | 1388.23 | 10.48 | 26.38 | 0 |
| Pre: | Boric Acid | 131.9 | 1727.48 | 13.10 | 58.02 | 25.03 |
| Post: | Boric Acid Potash | 131.6 | 945.08 | 7.18 | −13.37 | 0 |
| Pre: | Boric Acid Potash | 132.5 | 1578.36 | 11.92 | 43.72 | 65.91 |
| Post: | Boric Acid Am. Sulfate | 130.6 | 1114.74 | 8.53 | 2.91 | 0 |
| Pre: | Boric Acid Am. Sulfate | 132.9 | 1655.00 | 12.45 | 50.21 | 45.96 |
| Post: | Boric Acid Potash STMP | 128.9 | 926.83 | 7.19 | −13.26 | 0 |
| Pre: | Boric Acid Potash STMP | 138.0 | 2112.71 | 15.31 | 84.71 | 112.96 |
| Post: | Boric Acid Am. Sulfate STMP | 131.4 | 980.38 | 7.46 | −10.04 | 0 |
| Pre: | Boric Acid Am. Sulfate STMP | 128.1 | 1227.28 | 9.58 | 15.52 | 28.40 |

The results in Table IV show that some combinations of additives, such as potash or ammonium sulfate, boric acid, and sodium trimetaphosphate, have an unexpected synergistic effect and further improve compressive strength on precalcination relative to a neat control and to a control having the same reagents added together after calcination. The combination of precalcination additives providing the greatest increase in compressive strength was boric acid, potash and sodium trimetaphosphate, which provided an 85% improvement over the neat control and a 113% improvement over the use of the same additives postcalcination.

While various embodiments have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of making a gypsum board, comprising the steps of:
    combining raw gypsum, and an additive selected from the group consisting of: ammonium phosphate monobasic, ammonium phosphate dibasic, aluminum phosphate, sodium aluminum sulfate, calcium chloride, potassium chloride, sodium hydroxide, sodium bicarbonate, potassium carbonate, sodium carbonate, ferric chloride, ferric nitrate, aluminum nitrate, boric acid, ammonium sulfate, potassium sulfate, boric oxide, sodium trimetaphosphate, sodium phosphate tribasic dodecahydrate, citric acid, Borax, sodium tripolyphosphate, ammonium polyphosphate, sodium phosphate monobasic, trisodium phosphate, calcium phosphate monobasic, calcium phosphate tribasic, calcium carbonate, sodium phosphate tribasic dodecahydrate, calcium nitrate tetrahydrate, urea, talc, sodium acetate, aluminum sulfate, calcium phosphate dibasic, sodium metaborate, tartaric acid, trisodium phosphate, potassium phosphate tribasic, and a mixture thereof to first form a combined raw gypsum and additive;
    then milling the combined raw gypsum and additive to form a milled raw gypsum and additive;
    next flash calcining the milled raw gypsum and additive to produce stucco;
    mixing the stucco with water to form a gypsum slurry; and
    sandwiching the gypsum slurry between two sheets of facing material to form the gypsum board.

2. The method of claim 1, wherein the additive is present in an amount of about 0.1% by weight of the raw gypsum.

3. The method of claim 1, wherein the additive is present in an amount of between about 0.01% to about 1% by weight of the raw gypsum.

4. The method of claim 1, wherein the additive is present in an amount of between about 0.01% to about 0.1% by weight of the raw gypsum.

5. The method of claim 1, wherein the additive is selected from the group consisting of: sodium trimetaphosphate, sodium tripolyphosphate, ammonium polyphosphate, sodium phosphate monobasic, trisodium phosphate, sodium aluminum sulfate, ammonium phosphate monobasic, calcium carbonate, potassium carbonate, calcium chloride, potassium chloride, ferric chloride, aluminum sulfate, tartaric acid, citric acid, Borax, sodium phosphate tribasic dodecahydrate, calcium phosphate dibasic, calcium nitrate tetrahydrate, urea, talc, sodium metaborate, ammonium phosphate dibasic, ammonium sulfate, boric acid, boric oxide, calcium phosphate monobasic, ferric nitrate, potassium phosphate tribasic, potassium sulfate, sodium phosphate tribasic, and a mixture thereof, and the additive is present in an amount between about 0.01% to about 1% by weight of the raw gypsum.

6. The method of claim 1, wherein the additive is a combination of boric acid and Potash.

7. The method of claim 1, wherein the additive is a combination of boric acid and ammonium sulfate.

8. The method of claim 1, wherein the additive is a combination of boric acid, Potash and sodium trimetaphosphate.

9. The method of claim 1, wherein the additive is a combination of boric acid, ammonium sulfate and sodium trimetaphosphate.

10. The method of claim 1, wherein the additive is boric acid.

* * * * *